US007987496B2

(12) United States Patent
Bryce et al.

(10) Patent No.: US 7,987,496 B2
(45) Date of Patent: Jul. 26, 2011

(54) AUTOMATIC APPLICATION OF INFORMATION PROTECTION POLICIES

(75) Inventors: Duncan G. Bryce, Redmond, WA (US); Scott C. Cottrille, Sammamish, WA (US); Pankaj Mohan Kamat, Kirkland, WA (US); Krassimir Karamfilov, Bellevue, WA (US); Gregory Kostal, Kirkland, WA (US); Kenneth D. Ray, Seattle, WA (US); Vladimir Yarmolenko, Duvall, WA (US); Yuhui Zhong, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 763 days.

(21) Appl. No.: 12/101,688

(22) Filed: Apr. 11, 2008

(65) Prior Publication Data

US 2009/0260054 A1 Oct. 15, 2009

(51) Int. Cl.
*H04L 9/00* (2006.01)
(52) U.S. Cl. ............................................. 726/1; 726/26
(58) Field of Classification Search .................. 726/1, 26
See application file for complete search history.

(56) References Cited

U.S. PATENT DOCUMENTS

| 7,891,007 | B2 * | 2/2011 | Waxman et al. ................ 726/27 |
|---|---|---|---|
| 2004/0128394 | A1 | 7/2004 | Knauerhase |
| 2005/0038881 | A1 | 2/2005 | Ben-Itzhak |
| 2005/0066165 | A1 | 3/2005 | Peled |
| 2005/0216901 | A1 | 9/2005 | Speare |
| 2005/0288939 | A1 | 12/2005 | Peled |
| 2006/0004868 | A1 | 1/2006 | Claudatos |
| 2006/0048224 | A1 | 3/2006 | Duncan |
| 2006/0120526 | A1 | 6/2006 | Boucher |
| 2007/0136603 | A1 | 6/2007 | Kuecuekyan |
| 2007/0185980 | A1 | 8/2007 | Abraham |
| 2007/0220588 | A1 | 9/2007 | Panda |
| 2007/0226775 | A1 | 9/2007 | Andreasen |
| 2008/0243699 | A1 * | 10/2008 | Hilerio et al. ................... 705/59 |
| 2009/0097042 | A1 * | 4/2009 | Miyata ......................... 356/620 |
| 2009/0183205 | A1 * | 7/2009 | McCartie et al. ............... 725/56 |
| 2009/0281995 | A1 * | 11/2009 | Mousavi et al. .................. 707/3 |
| 2010/0058485 | A1 * | 3/2010 | Gonzalez ........................ 726/27 |
| 2010/0070756 | A1 * | 3/2010 | Onno et al. .................... 713/153 |
| 2010/0107217 | A1 * | 4/2010 | Liu et al. .......................... 726/1 |
| 2010/0180349 | A1 * | 7/2010 | Koohgoli et al. ............... 726/30 |

FOREIGN PATENT DOCUMENTS

EP 1378813 11/2004

OTHER PUBLICATIONS

Schneider, Fred B., "Enforceable Security Policies", 2002, Cornell University, US, available at: http://utd.edu/~kxh060100/Papers/EnfSecPols.pdf.
Likavec, Jaromir et al., "Enforcing Messaging Security Policies", Germany, available at: http://www.wolthusen.com/publications/IWIA2005.pdf.
Burns, J. et al., "Automatic Management of Network Security Policy", 2001, Telcordia Technologies, Inc., US, available at: http://govt.argreenhouse.com/SmartFirewall/Paper/discex_paper.pdf.

* cited by examiner

*Primary Examiner* — Krisna Lim
(74) *Attorney, Agent, or Firm* — Workman Nydegger (57) ABSTRACT

The secure application of content protection policies to content. The secure application of content protection polices is accomplished by having an enforcement mechanism monitor policy application points to detect the transfer of content. The enforcement mechanism accesses the content and a determination is made to protect the content. A usage policy is then identified by the enforcement mechanism to apply to the content and the usage policy is then applied to the content, resulting in a usage policy for the content.

20 Claims, 4 Drawing Sheets

AUTOMATIC APPLICATION OF INFORMATION PROTECTION POLICIES

CROSS-REFERENCE TO RELATED APPLICATIONS

Not Applicable

BACKGROUND

Computers are useful for creation and exchange of information between users. Often, the information or "content" generated may be confidential, to either an individual or group. In such instances it is desirable to protect the content and develop a policy regarding who can use the content, in what ways and with what conditions. Content other than confidential information can be protected by a policy as well.

Different solutions to protecting data have been implemented. For instance, an individual or an organization can have a manually implemented policy wherein each user manually makes a determination of the content that is created, and protects the content. An example of manually protecting the content would be storing a disk containing the content in a locking storage location. Another example would be a user sending an email to a second user along with an associated message asking the second user to keep the content secure.

Other security solutions exist such as having directories and drives password protected. The access to the drives can be limited to individual users or groups and typically, the content on the drives can have limits such as read only specific to each user or group. Individual files may be password protected as well. For instance, a user may determine that a file is confidential and the user can protect the file with a password before saving or transmitting it.

In some environments, a usage policy may be used to secure content. In such an environment, a publishing user can determine that the content needs to be protected and then associate a usage policy with the protected information. The usage policy is an electronic document containing content required to read the document and describes who can use the content and in what ways. In order to access the document, a user can contact a license server supply the usage policy and an identification of the user, and in return receiving a usage license, thereby allowing the user to access the information.

BRIEF SUMMARY

The concepts described in this application are generally directed to embodiments for the secure application of information protection policies.

In one embodiment, the application of content protection policies is performed in a secure environment. A pre-defined policy application point is monitored to detect the transfer of content through the policy application point. The content being transferred through the pre-defined policy application point is accessed and a determination is made, based on the content, the content classification rules, and the system state, that the content should be protected. To facilitate access to the content classification rules, they are maintained in a repository at a known location so that any appropriate enforcement mechanism can access the content classification rules. A usage policy is then identified to apply to the content, based on the content, the content classification rules, and the system state. The identified usage policy is then applied to the content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The concepts described in this application are generally directed to embodiments for the automatic application of information protection policies. In some cases, the embodiments can comprise a special purpose or general-purpose computer including various computer hardware and/or firmware and/or software, as discussed in greater detail below.

Although not necessary, in one embodiment, the automatic application of information protection policies is performed in a secure environment. A pre-defined policy application point is monitored to detect the transfer of content through the policy application point. The content being transferred through the pre-defined policy application point is accessed and a determination is made, based on the content, the content classification rules, and the system state, that the content should be protected. To facilitate access to the content classification rules, they are maintained in a repository at a known location so that any appropriate enforcement mechanism can access the content classification rules. A usage policy is then identified to apply to the content, based on the content, the content classification rules, and the system state. The identified usage policy is then applied to the content.

In this description and the claims that follow, "content" is generally defined as information to which usage policies can be applied. Content can be contained within a file or can be the file itself.

In this description and the claims that follow, a "local user" is a user on a machine on which the information protection policy is to be applied and enforced. The user may have administrative privileges on the machine itself.

In this description and the claims that follow, a "policy administrator" is a user with the privileges required to configure information protection policies and content classification rules for a group of machines and users.

In this description and the claims that follow, a "policy application point" is defined as a conceptual location that content passes through and is capable of being monitored.

In this description and the claims that follow, an "enforcement system" is defined as a system that monitors policy application points and enforces policy rules with respect to the content that passes through the policy application point. An enforcement system may be part of the operating system of a local user's computer, a server, a standalone computing module, etc.

In this description and the claims that follow, a "protected directory" is defined as a file system directory that has content classification rule associated with the directory, the application of which will result in a usage policy being applied to the content.

In this description and the claims that follow, a "protected file" is defined as a file that is protected to some usage policy.

In this description and the claims that follow, a "usage policy" is defined as an expression of policy for protected content that completely describes who can use the information, in what ways and with what conditions.

In this description and the claims that follow, a "content classification rule" is defined as a correlation that associates a system state and content criteria with a usage policy. For example, a content classification rule can require that all content produced on a user's local system be protected, or it may require a limited subset of content produced be protected based on an content criteria such as the parent directory of the content.

In this description and the claims that follow, "transparent processing" is defined as the processing of content without requiring user interaction. For instance, a file system can automatically determine if a file or directory has an associated usage policy that needs to be enforced. Such determination will occur without requiring the user manually invoking an operation. The user typically will be unaware of the underlying process of determining if the file or directory is protected. In some instances, the user may be notified of such processing, but the processing will not require user interaction and is still considered to be transparent.

Figure 1:
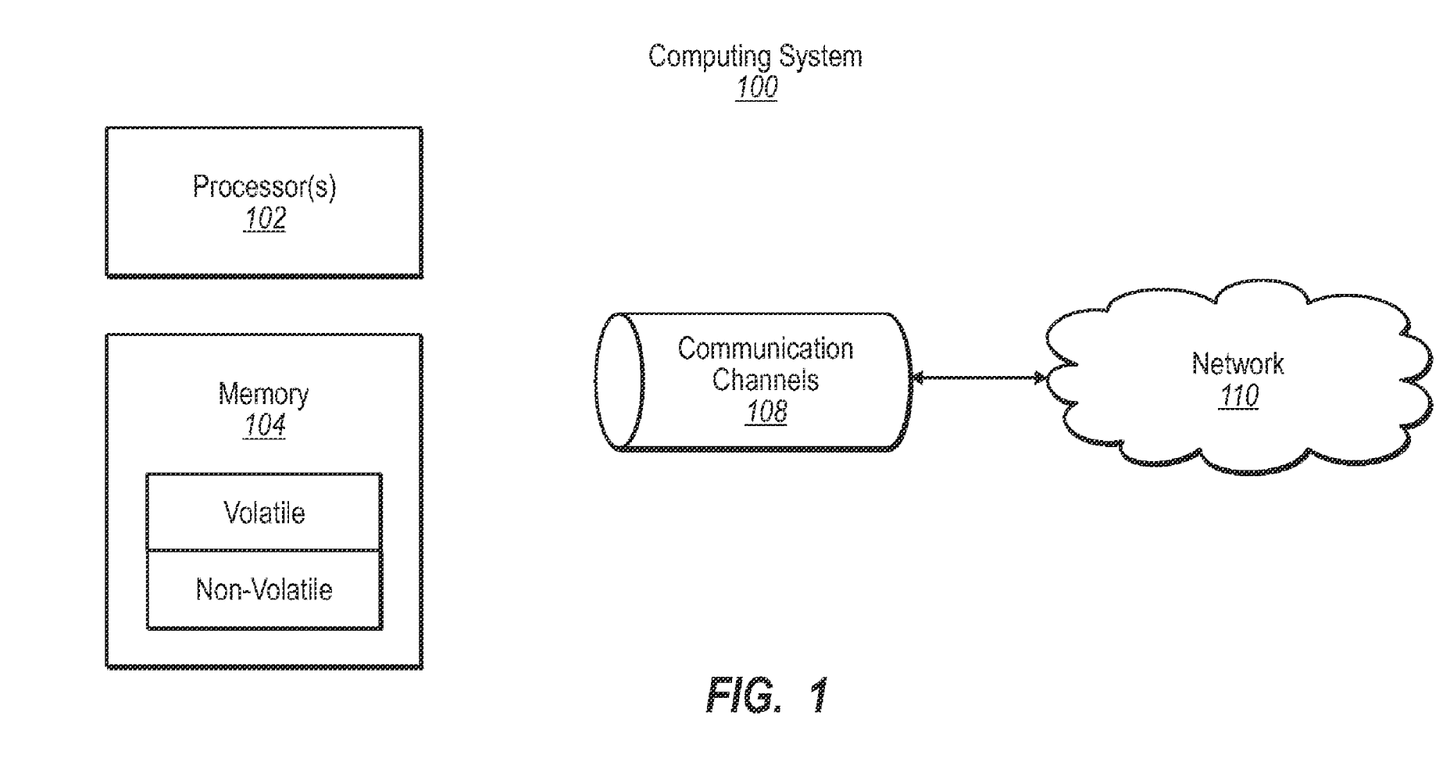
FIG. 1 illustrates a suitable operating environment in which to implement the described embodiments.

Referring to FIG. 1, in one configuration, a computing system 100 includes a processing unit 102 and memory 104. The processing unit may consist of multiple processing cores or multiple processors. The memory 104 may be physical system memory, which may be volatile, non-volatile, or some combination of the two. The term "memory" may also be used herein to refer to non-volatile mass storage such as physical storage media. As used herein, the term "module" or "component" can refer to software objects or routines that execute on the computing system. The different components, modules, engines, and services described herein may be implemented as objects or processes that execute on the computing system (e.g., as separate threads).

Computing system 100 may also contain communication channels 108 that as allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When content is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system.

Figure 2:
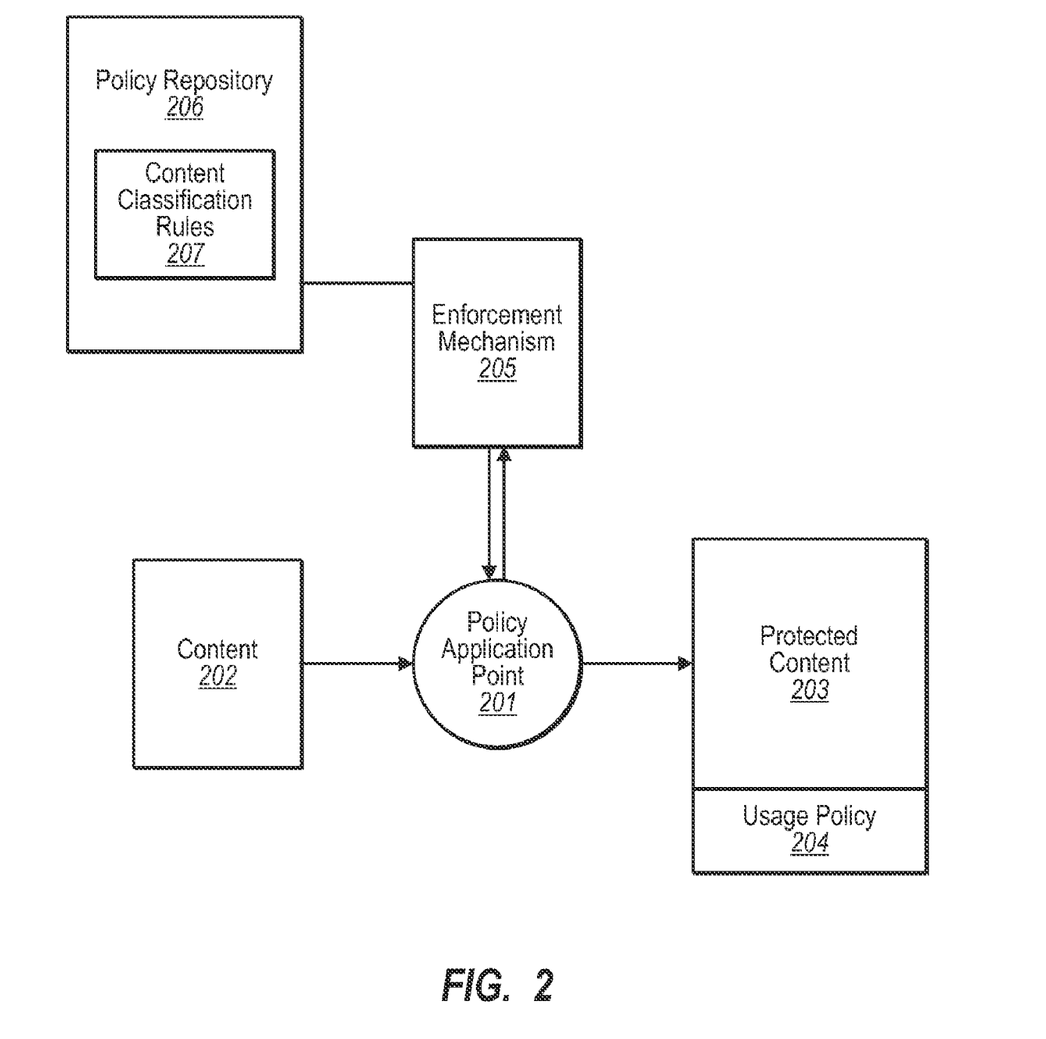
FIG. 2 illustrates the relationship between content, an application access point, and an enforcement mechanism.

FIG. 2 shows a simplified view of the relationship between content 202, a policy application point 201, and an enforcement mechanism 205. Content 202 enters into policy application point 201 that is monitored by enforcement mechanism 205. Enforcement mechanism 205 can be a component of an operating system, incorporated into a server, or may exist as its own computing module. Enforcement mechanism 205 can access the content 202 prior to the content 202 passing through the policy application point 201. Enforcement mechanism 205 can access a policy repository 206 containing content classification rules 207. The enforcement mechanism 205 can then apply a usage policy 204 to the content 202 based on at the state of the system, the content classification rules 207, and the content 202 The enforcement mechanism 205 can encrypt or otherwise protect the content 202 resulting in protected content 203 and usage policy 204.

Figure 3:
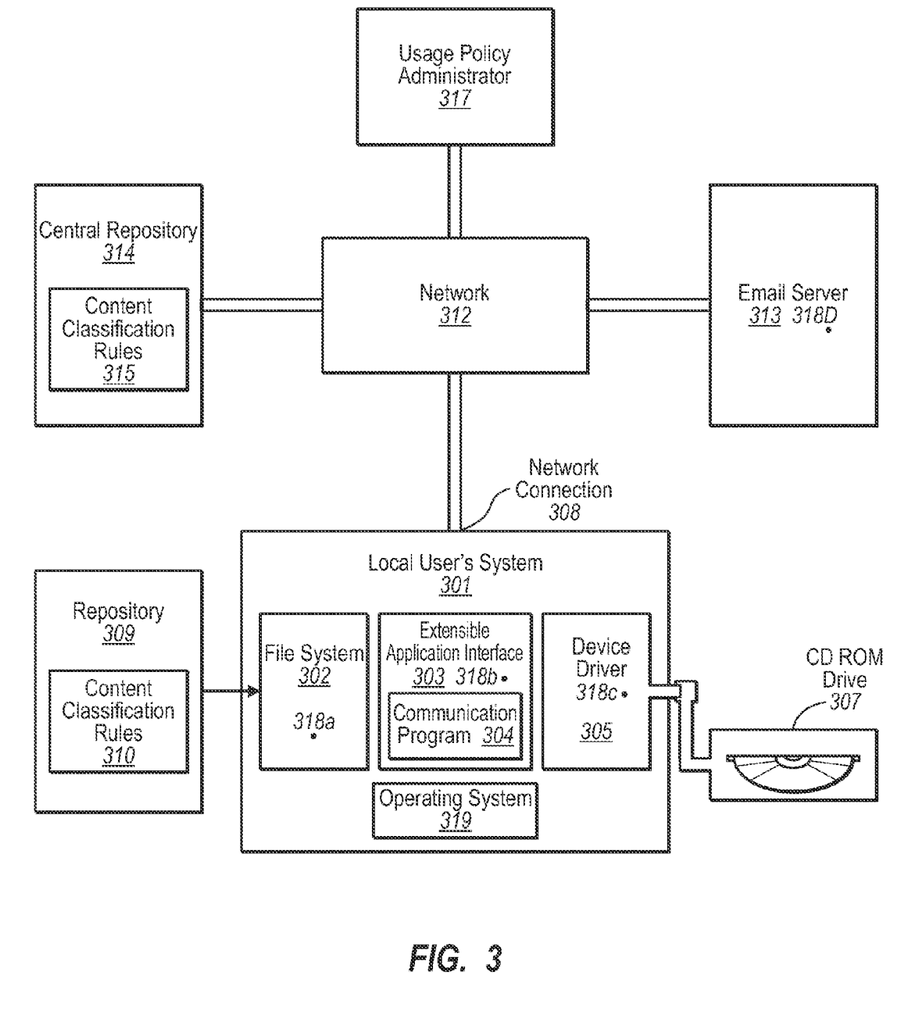
FIG. 3 illustrates a suitable network environment in which the content can be monitored and suitable usage policies applied.

FIG. 3 shows an exemplary simplified network on which the described embodiments can be practiced. A local user's system 301 contains an operating system 319, a file system 302, an extensible application interface 303, and a device driver 305. Although the current embodiment illustrates the local user's system 301 as containing each of these components, other embodiments are possible wherein the local user's system 301 may contain a subset of the identified components.

The file system 302 is a set of abstract data types that are implemented for the storage, hierarchical organization, manipulation, navigation, access, and retrieval of data. In addition to the standard requirements of a typical file system, file system 302 is an extended file system with enhanced capabilities. The file system 302 is enhanced to allow the file system 302 to associate a usage policy with a file and/or a directory, to associate content classification rules with a directory and to transparently process the usage policy in normal operation.

The local user's system 301 is managed by the operating system 319 which can have a secure environment in which users specified in the usage policy are allowed to access a file's contents. Additionally, the file's contents may be encrypted so that a user having access to a specific key may read the file's contents. Furthermore, the specific key can be contained within a usage policy associated with the file, which can be encrypted to a separate key accessible to the user. A usage policy can be further associated with a directory. In one embodiment, when a file is created in a directory associated with a usage policy, the usage policy can be referenced to create a separate usage policy for the file and the file can be protected to that usage policy. When an application attempts to invoke a file system operation upon a protected file, the file system automatically performs any access checks, decryption, and gathering of user input required to access the underlying data contained within the file.

In one embodiment, the operation system 319 can have a secure environment allowing applications to be executed with a reduced likelihood that the application has been tampered with. As part of the secure environment, the operating system 319 is further capable of uniquely identifying applications. For example, when an application attempts to open a word processing document, the operating system 319 is able to distinguish whether the application is truly the identified application, or is instead a rogue application masquerading as the identified application.

The extensible application interface 303 provides an interface between the local user's system 301 and a computer program such as a communication program 304. The extensible application interface 303 provides for policy application points such as policy application point 318b to monitor content that passes between the local user's system 301 and the computer program 304. The extensible application interface 303 is able to associate a usage policy with the content that passes through it.

The device driver 305 provides for a means for a device, such as a CD ROM drive 307 to interact with the local user's system 301. A policy application point such as policy application point 318c can be implemented to monitor the content as transferred between the local user's system 301 and the device supported by the device driver 305. The device driver 305 is capable of associating a usage policy with the content passing between the local user's system 301 and the device.

The local user's system 301 is shown connected to network 312 utilizing network connection 308. While not shown for simplicity, network connection 308 can be controlled by a device driver containing a policy application point for monitoring the content exchanged between the local user's system 301 and the network connection 308.

The network 312 can contain a server, such as email server 313, a local user's system 308, and a usage policy administrator 317, and a central repository 314 of content classification rules 315. While the usage policy administrator 317 is shown as a component in the network 312, it will be understood that the usage policy administrator 317 can be a user capable of administering the content classification rules and need not exist on the network so long as they have access to the content classification rules. In some embodiments, the usage policy administrator 317 can be a user operating local user's system 301, and can be subject to the automatic application of information protection policies. Furthermore, while the server is depicted as an email server, there is no restriction to other types of servers being present. For instance, server may be a file server or a database server with a suitable policy application point for monitoring content.

Email server 313 can have an associated policy application point 318d capable of monitoring the email being processed by the email server 313. Based on the content classification rules associated with the policy application point 318d, the email server 313 can associate a usage policy with content being processed by the email server 313.

The central repository 314 of content classification rules 315 can be stored in a repository that is discoverable by policy administrator 317 and policy enforcements systems such as the file system 302, email servers 313, etc. In one embodiment, the central repository 314 of content classification rules 315 can be centrally administered by policy administrators 317. One example of a central repository meeting this description is the Group Policy implemented in the Windows environment. Although Group Policy is identified, one of skill in the art would recognize that many known types of repositories are capable of meeting these requirements.

In one embodiment, the administrative policies contained in the central repository 314 of content classification rules 315 can be transferred securely to a known location on all machines in which the policy is to be enforced such as local user's system 301 or email server 313. The local repository 309 of content classification rules 310 is shown in FIG. 3 as being next to local user's system 301, but the actual location of the local repository 309 of content classification rules 310 can be anywhere securely accessible by the enforcement system. When transferring the content classification rules, it is generally desirable, although not necessary, for a local user to be unable to tamper with the configured content classification rules without detection. This can be done by cryptographically signing the content classification rules using a key known to the policy administrator 317, but as one of skill in the art would recognize, other techniques are possible. Additionally, it is desirable for a local user to be unable to block the transfer of the content classification rules to their machine without detection. Such detection is possible through the use of digital signatures and times stamps, or other methods known to those of ordinary skill in the art.

The content classification rule found in the repositories 309 and 314 correlate an association between a system state and a usage policy. While many different content classification rules are possible, five exemplary rules are as follows:

Rule 1. Protection of content based on attributes of the parent directory.

This rule specifies that all file-based content created within a directory with certain attributes (as configured by the policy administrator) will be created as protected files. The implementation may decide to allow the association of specific usage policies with known directory locations. For example, a policy administrator can decide to protect all data created within their users profiles to a certain usage policy. The system would then use the directory's location attribute to enforce that all data created in the user profiles is protected to the usage policy.

Rule 2. Protection of content based on attributes of the parent application.

This rule specifies that all file-based content created from an application with certain attributes (as configured by the policy administrator) can be created as protected files. As an example, an administrator may want to protect all source code produced in by all machines connected to a particular network. The system can use the application identity attribute to enforce that all file-based content created from within these source code editors is protected to a usage policy identified by an appropriate content classification rule.

Rule 3. Transfer of content across system boundaries.

This rule specifies that all file-based content crossing a designated system boundary must be protected. Example of system boundaries include files transferred to a CD, over a USB connection or over a network. For example, an administrator may want to ensure that any file transferred outside of a controlled as environment is protected. The administrator can configure a rule that applies a usage policy to any content determined to be transferred off a machine. The system must enforce that any data that crosses this boundary is protected to the usage policy specified in the content classification rules.

Rule 4. Creation of content that meets pre-established "match" conditions.

This rule specifies that all content moving through a policy application point that matches a pre-establish "match" condition be protected with an appropriate usage policy. For example, a policy administrator can ensure that all email messages authored by anyone in the finance division contains a spreadsheet attachment be protected via a company confidential usage policy. The email server system can enforce that any email messages that follow through the system that match the rule be protected using the configured usage policy.

Rule 5. Protect all content

No predefined set of rules can be entirely complete. Therefore, a catchall rule can be defined, that requires all content passing through a policy application point be protected. As an example, a policy administrator can ensure that all content copied to a disk will always have a usage policy applied to it.

Once the content classification rules have been configured by a policy administrator 317 and the rules have been transferred to a policy repository accessible to the policy enforcement mechanism 205, the rules can be applied.

Figure 4:
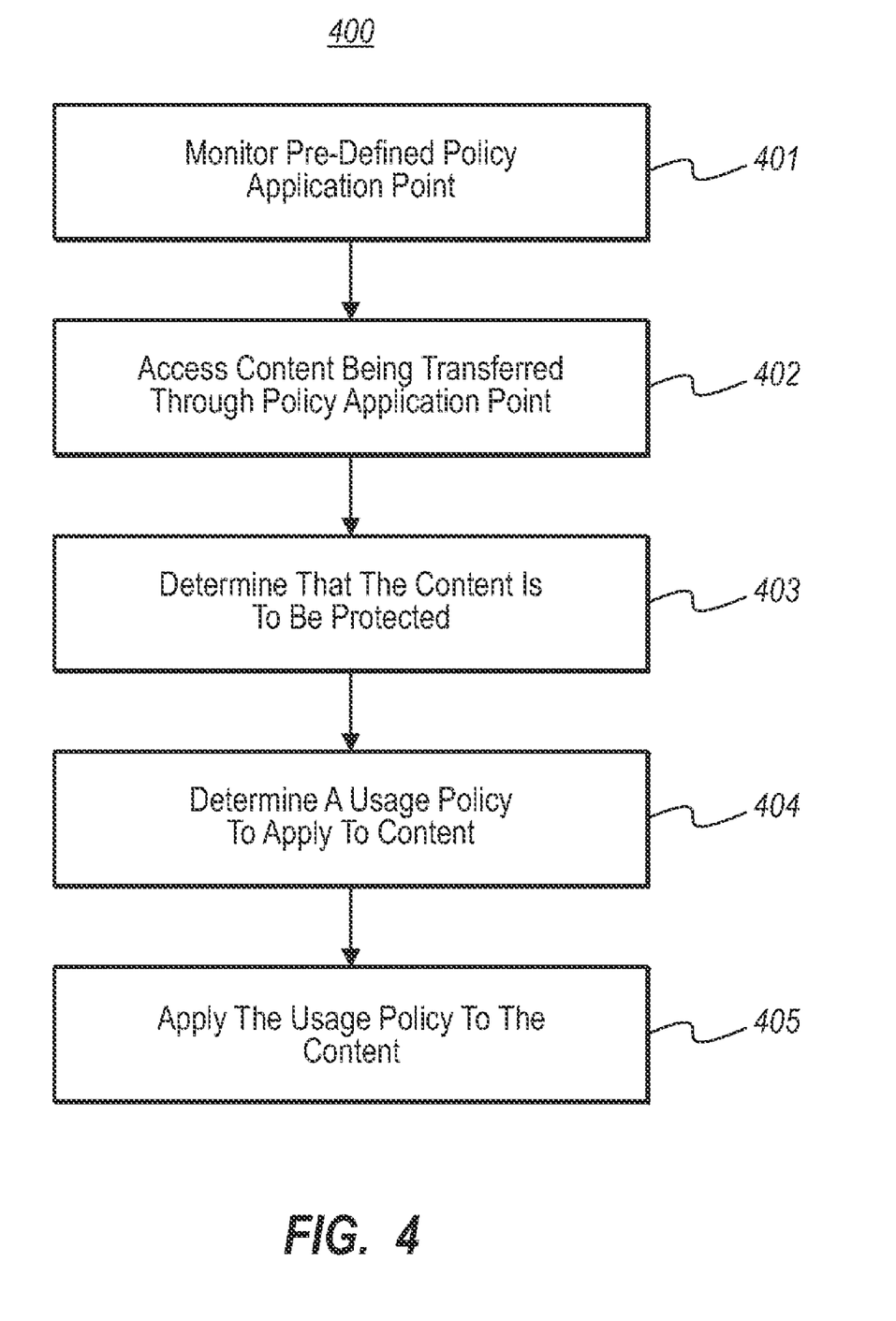
FIG. 4 illustrates a flowchart corresponding to a method for the automatic application of usage policies.

Method 400, as shown in FIG. 4, includes a series of acts for the automatic application of a usage policy to content. In act 401, a pre-defined policy application point is monitored to detect the transfer of content through the policy application as point. In act 402, the content being transferred through the predefined policy application point is accessed. As an example, the operating system 319 of the local user's system 301 can act as an enforcement mechanism 205 and detect the transfer of content 202 through file system 302 policy application point 318a. Alternatively, if the content 202 were being transferred to a device such as CD ROM drive 307, the transfer may be detected by the enforcement mechanism 205 as the content 202 passes though policy application point 318c associated with the device driver 305 of the device. In the case of content 202 being transferred via email, the enforcement mechanism 205 can be the email server 13 and the transfer may be detected by the email server 313 at policy application point 318d. Additionally, an extensible application interface 303 may exist providing a monitoring layer for an application 304 such as an instant messenger type program wherein the transfer of content 202 can be detected at policy application point 318b. The content 202 being transferred through the policy application points 318a-d can be accessed by the appropriate enforcement mechanism 205.

In act 403, based on the accessed content 205, the content classification rules 207, and the system state, a determination that the content 202 is to be protected is made. For example, for content 202 passing though an access point such as access points 201, the enforcement mechanism 205 can evaluate the content 202 with regard to content classification rules 207 maintained in repository 206 and the state of the local user's system 301.

For content passing through policy application point 318a associated with the file system 302, the enforcement mechanism's determination of whether to protect the content will vary depending on what rules are enforced. As an example, in one embodiment, rules 1, 2, 3, and 5 can be enforced by the enforcement mechanism 205 as when content (a new file for instance) is created. If the file is being created in a protected directory, then rule 1 would be applicable and the content would be protected. If the file were not in a protected directory, then rule 1 would not be applicable and the file would be unprotected unless some other rule applied. If the file were created from within a secured application, based on rule 2 the file would be protected. Conversely, if the file were generated from a non-secure application, no protection would result from the application of rule 2. If the file were created at a network location, then rule 3 would come into play because the file would cross a network boundary. If the file were instead created at a local location, then rule 3 would be inapplicable. Finally, in some instance it may be desirable that all files are protected and 5 can be enforced which would protect all content. As one of skill in the art would recognize, the enforcement of other rules by the enforcement mechanism 205 are possible.

For content passing through policy application point 318b, the extensible application interface 303, any of the rules can be applied, but in one embodiment, rule 5 would typically be enforced by the enforcement mechanism 205. For instance, policy application point 318b can be associated with a communication program 304 such as an instant messaging program. Any content passing through policy application point 318b would then be protected by the enforcement mechanism 205 based on rule 5. Furthermore, policy application point 318b could be associated with any program where content protection is desired by the policy administrator 317.

Policy application point 318c associated with device driver 305 is particularly useful for protecting content passing across the system boundaries. For example, policy application point 318c can be associated with an external connection such as a USB or network connection, or internal drive such a floppy drive or compact disk as drive. In one embodiment, rule 3 can be implemented by the enforcement mechanism 205 wherein all content passing across the system boundary is protected. Alternatively, other rules could be enforced such as rule 4 which protect the content whenever a keyword was detected in the content.

Content passing through the email server 313 can be detected at policy application point 318*d* by the enforcement mechanism 205. In one embodiment, the policy application point 318*d* can have rules 4 and 5 associated with the policy application point 318*d*. As an example, if an email message is received, routed, stored, or delivered by the system, and rule 4 is enforced, then the email would be protected if criteria were matched. For instance, if the email contains a confidential project name, or originates in a particular department, then the content can be protected. For heightened security, rule 5 can be enforced wherein all content that the email server 313 processes will be protected. While only rules 4 and 5 have been specifically addressed, other rules could be applied to policy application point 318*d*.

If it is determined in act 403 that the content is to be protected, in act 404, based on the accessed content, the content classification rules, and the system state, a usage policy is determined to apply to the content. For example, at policy application point 318*a*, if the content is determined to be protected based on rule 1, then an enforcement mechanism 205 can determine a usage policy associated with the protected directory to apply to the content. At policy application point 318*d*, a usage policy can be associated with a category of email messages and with the application of rule 4, the usage policy associated with the matching category of messages would be applied by the enforcement mechanism 205 to the content. Other possibilities exist, such as at policy application point 318*b*, wherein if rule 5 is applied, a policy as can exist that is applicable to all content.

In act 405, the usage policy is applied to the content based on the applicable content classification rules. For example, at policy application point 318*d*, email server 313, acting as an enforcement mechanism 205, may apply the usage policy to the content resulting in protected content.

The content classification rules can be cryptographically signed to prevent tampering. In one embodiment, the policy administrator 317 can sign the content classification rules using a key accessible to the policy administrator 317. The signature would then be verified within the operating system by the enforcement mechanism 205 at the policy application point. In the instance where the signature validation fails, the operating environment would abort the operation in progress when the policy application point was triggered.

In another embodiment, the policy administrator can securely time stamp the content classification rules to prevent blocking of the application of the content classification rules by the enforcement mechanism. The policy application point can then validate that the local policy was timestamped within some allowed interval. If the timestamp is older than the specified interval, then the secure execution environment can abort the operation in process at the time the policy application point was triggered.

It can be desirable to limit the application of the automatic application of the usage policy to some files. In one embodiment, the operating system can determine to disable policy application for content that would cause destabilization or damage to the system if protected. For instance, in a Windows operating system the policy application could be disabled if the file is a system file, a protected directory such as the windows directory or the program file directory, or otherwise indicated as being a protected system file. One of ordinary skill in the art would recognize that it may be desirable to block the automatic application of usage policy rules of other file types and that this list is not a complete listing of files that may benefit from not having the usage policy applied.

The described rules can also be applied to automatic policy removal. For example, at policy application point 318*a*, a rule can exist wherein all content saved to a particular directory would have the usage policy removed. Another example would be a policy application point associated with a data backup server, for instance a device driver 305 policy application point 318*c* or an extensible application layer 303 policy application point 318*b* monitoring a backup program. In such instances, it can be desirable to remove all usage policies associated with the content being archived to the backup server.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method for the secure application of a usage policy to content based on content classification rules describing correlations associating a system state with a usage policy, wherein the application of the usage policy results in a content protected to the usage policy, the method comprising:

monitoring a pre-defined policy application point to detect the transfer of content;

accessing the content being transferred through the pre-defined policy application point;

determining, based on the content, the content classification rules and the system state, that the content should be protected, wherein the content classification rules are maintained in a repository at a known location so that any appropriate enforcement mechanism can access the policy rule;

identifying, based on the content, the content classification rules and the system state, a usage policy to apply to the content, wherein the usage policy is maintained at the repository so that any appropriate enforcement mechanism can access the policy rule; and applying the usage policy to the content, wherein the application of the usage policy results in a functional usage policy for the content.

2. The method of claim 1, wherein the pre-defined policy application point comprises a file system, the file system having enhanced capabilities comprising:

the ability to associate a usage policy with a file;

the ability to associate a usage policy with a directory; and the ability to transparently process the usage policy of a file and directory.

3. The method of claim 1, wherein the predefined policy application point comprises a server, the server having enhanced capabilities comprising:

the ability to associate a usage policy with an email message;

the ability to associate a usage policy template with a category of email messages; and the ability to transparently process the usage policy in email server routing, delivery and storage.

4. The method of claim 1, wherein the pre-defined policy application point comprises a device driver, the device driver having enhanced capabilities comprising:

the ability to monitor content transferred to a device related to the device driver;

the ability to cause a usage policy to be applied to the content being transferred to the device; and the ability to transparently process the usage policy for content passing through the device driver.

5. The method of claim 1, wherein the pre-defined policy application point comprises an extensible policy application point layer, the extensible policy application point layer having enhanced capabilities comprising:

the ability to monitor content processed by the application associated with the extensible policy application point layer, the ability to cause a usage policy to be applied to the content being processed by the application associated with the extensible policy application point layer; and the ability to transparently process the usage policy for content passing through the extensible policy application point.

6. The method of claim 1, further comprising disabling the automatic application of the usage policy for predetermined content types.

7. The method of claim 1, wherein the repository of content classification rules is discoverable and available by policy administrators and policy enforcement systems.

8. The method of claim 1 further comprising maintaining a central repository of content classification rules wherein the content classification rules are securely transferred to the repository location known to all user machines wherein a local user is unable to tamper with the content classification rules without detection and wherein the local user is unable to block transfer of the content classification rules without detection.

9. A computer-readable storage media storing computer executable instructions that when executed implement a method for the secure application of a usage policy to content based on content classification rules describing correlations associating a system state with a usage policy, wherein the application of the usage policy results in a functional usage policy for the content, the method comprising:

monitoring a pre-defined policy application point to detect the transfer of content;

accessing the content being transferred through the pre-defined policy application point;

determining, based on the content, the content classification rules and the system state, that the content should be protected, wherein the content classification rules are maintained in a repository at a known location so that any appropriate enforcement mechanism can access the policy rule;

identifying, based on the content, the content classification rules and the system state, a usage policy that is to be applied to the content, wherein the usage policy is maintained at the repository so that any appropriate enforcement mechanism can access the policy rule; and applying the usage policy wherein the application of the usage policy template results in a functional usage policy for the content.

10. The computer-readable storage media of claim 9 wherein the pre-defined policy application point comprises a file system, the file system having enhanced capabilities comprising:

the ability to associate a usage policy with a file;

the ability to associate a usage policy with a directory; and the ability to transparently process the usage policy of a file.

11. The computer-readable storage media of claim 9, wherein the predefined policy application point comprises an email server, the email server having enhanced capabilities comprising:

the ability to transparently associate a usage policy with an email message;

the ability to transparently associate a usage policy with a category of email messages; and the ability to transparently process the usage policy in email server routing, delivery and storage.

12. The computer-readable storage media of claim 9, wherein the pre-defined policy application point comprises a device driver, the device driver having enhanced capabilities comprising:

the ability to transparently monitor content transferred to a device related to the device driver; and the ability to transparently cause a usage policy to be applied to the content being transferred to the device.

13. The computer-readable storage media of claim 9, wherein the pre-defined policy application point comprises an extensible policy application point layer, the extensible policy application point layer having enhanced capabilities comprising:

the ability to transparently monitor content processed by the application associated with the extensible policy application point layer, the ability to transparently cause a usage policy to be applied to the content being processed by the application associated with the extensible policy application point layer.

14. The computer-readable storage media of claim 9, further comprising disabling the automatic application of the usage policy for pre selected content types.

15. The computer-readable storage media of claim 9, wherein the repository of content classification rules is discoverable by policy administrators and policy enforcement systems.

16. The computer-readable storage media of claim 9 further comprising maintaining a central repository of content classification rules wherein the content classification rules are securely transferred to the repository location known to all user machines wherein a local user is unable to tamper with the content classification rules without detection and wherein the local user is unable to block transfer of the content classification rules to their machine without detection.

17. In a computing environment, a system for applying a usage policy to content based on content classification rules describing correlations associating a system state with a usage policy, wherein the application of the usage policy results in a functional usage policy for the content, the system comprising:

a processor executing computer-executable instructions; and a computer-readable storage media storing the computer-executable instructions, wherein the computer-executable instructions cause the system to perform a method when executed, the method comprising:

monitoring a pre-defined policy application point to detect the transfer of content;

accessing the content being transferred through the pre-defined policy application point;

determining, based on the content, the content classification rules and the system state, that the content should be protected, wherein the content classification rules are maintained in a repository at a known location so that any appropriate enforcement mechanism can access the policy rule;

identifying, based on the content, the content classification rules and the system state, a usage policy that is to be applied to the content, wherein the usage policy is maintained at the repository so that any appropriate enforcement mechanism can access the policy rule; and applying the usage policy to the content, wherein the application of the usage policy template results in a functional usage policy for the content.

18. The system of claim 17 wherein the pre-defined policy application point is associated with one of a device drive, a file system, an email server, and an extensible application layer.

19. The system of claim 17 wherein the repository known to all user machines comprises a central repository of content classification rules.

20. The system of claim 17 wherein the repository known to all user machines comprises a local repository of content classification rules.

* * * * *